Aug. 31, 1965   W. F. OLLIFF   3,204,233
SLOPE INDICATOR
Filed Oct. 18, 1961
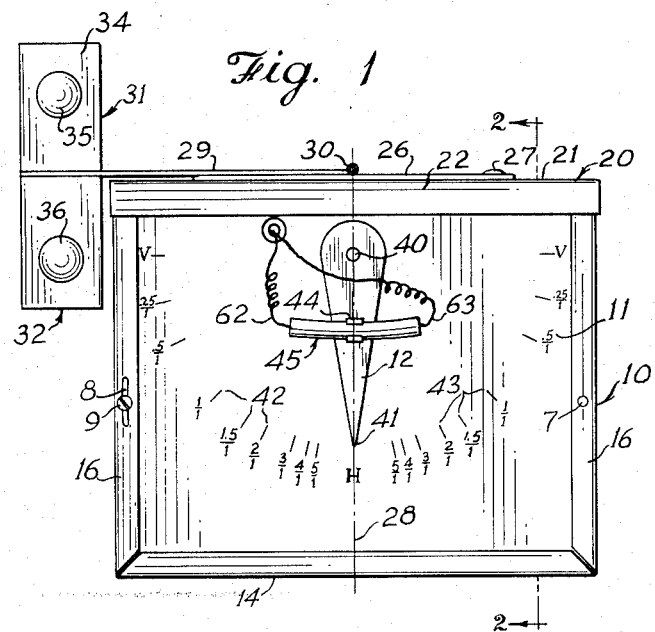
Fig. 1
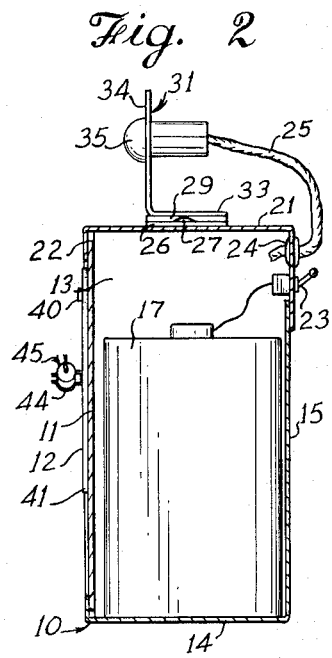
Fig. 2
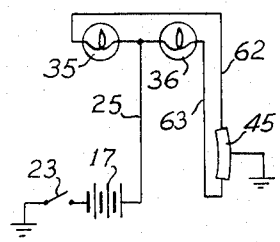
Fig. 3
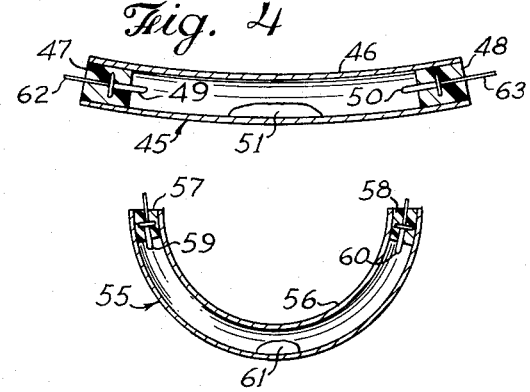
Fig. 4
Fig. 5
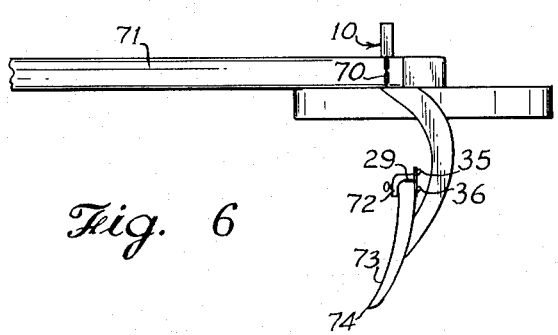
Fig. 6
INVENTOR.
William F. Olliff
BY
ATTORNEY

United States Patent Office 3,204,233
Patented Aug. 31, 1965

3,204,233
SLOPE INDICATOR
William F. Olliff, 3165 Ardley Road SW., Atlanta, Ga.
Filed Oct. 18, 1961, Ser. No. 145,883
2 Claims. (Cl. 340—282)

This invention relates to a slope indicator, and is more particularly concerned with a removable slope indictor which may be installed on a variety of road working devices to indicate when a pre-set slope has been achieved.

It is often desirable when utilizing grading or mowing equipment to have an indication of when a blade, or the entire device, is at a particular angle. This insures that the proper grade will be imparted to the ground by a grader and may also provide an indication of when the device is approaching a dangerously steep angle.

Briefly, the present device which achieves the purposes set forth above includes a mounting member which pivotally carries a downwardly extending mercury switch carrying arm or pointer. Progressively increasing slopes are marked by indicia in an arcuate path on the mounting member on opposite sides of a vertical center line so that the pointer may be moved so as to point to any selected indicia and thereby indicate the desired grade to be achieved. Transversely carried by the pointer is a mercury switch which actuates a pair of lights, the lights indicating whether a greater or less slope is desired, depending upon which light is lighted. By pivoting the mercury switch a variation in sensitivity of the device may be achieved.

Accordingly, it is the object of the present invention to provide a slope indicator which will indicate in which direction a device needs tilting, in order to achieve a prescribed slope for a device to which the slope indicator is attached.

Another object of the present invention is to provide a slope indicator which is inexpensive to manufacture, durable in structure and efficient in operation, the slope indicator being well suited to mass production.

Another object of the present invention is to provide a slope indicator which is entirely self-contained and may be readily and easily installed on a device to indicate the slope thereof.

Another object of the present invention is to provide a slope indicator which may be readily and easily set to indicate substantially any slope, from horizontal to vertical, and will indicate selectively both inclines and declines without the necessity of being re-positioned on a device.

Another object of the present invention is to provide a slope indicator in which the sensitivity of the indicator may be readily and easily carried, as desired.

Another object of the present invention is to provide a slope indicator which may be adjusted to compensate for unequal blade wear.

Another object of the present invention is to provide a slope indicator which will reduce the time required to train operators.

Another object of the present invention is to provide a slope indicator which has a visual indicating means capable of being positioned on any part of a grader for the optimum use of the operator.

Another object of the present invention is to provide a slope indicator which will accurately indicate the correction to be made regardless of the position of the grader.

Other objects, features and advantages of the present invention will become apparent from the following description when taken in conjunction with the accompanying drawings wherein like characters of reference designate corresponding views and wherein:

FIG. 1 is a side elevational view of a slope indicator constructed in accordance with the present invention.

FIG. 2 is a cross sectional view taken along line 2—2 in FIG. 1.

FIG. 3 is a schematic wiring diagram of the electrical circuit of the slope indicator shown in FIG. 1.

FIG. 4 is an enlarged cross sectional view of the mercury switch of the slope indicator shown in FIG. 1.

FIG. 5 is a cross sectional view similar to FIG. 4 and showing a modified form of mercury switch suitable for use in the slope indicator of FIG. 1.

FIG. 6 is a fragmentary view of a portion of a grader with the slope indicator of the present invention attached thereto.

Referring now in detail to the embodiment chosen for the purpose of illustrating the present invention, it being understood that in its broader aspects the present invention is not limited to the exact details herein depicted, numeral 10 denotes generally a rectangular box-like battery casing having a front 11 which forms a mounting member for a downwardly extending mercury switch carrying arm or pointer 12. In the present embodiment, the casing 10 includes a pair of sides, such as side 13, a bottom 14 and a back 15, joined together and to the front 11 by angle irons or flange members 16 so as to provide an open top portion. Batteries, such as battery 17, are received within casing 10 as shown in FIG. 2 to provide a source of electricity for the circuit hereinafter to be described.

It will be seen in FIG. 1 that front 11 is pivotally mounted to the midportion of one of the vertical flange members 16 by means of a pivot pin 7. The opposite vertical flange member 16 is provided with an arcuate slot 8 through which projects a lock bolt 9. The front 11 is slightly smaller than the frame formed by flange members 16 and therefore upon the loosening of lock bolt 9, the front 11 may be pivoted to a limited degree about pin 7 and thereafter locked in a predetermined position upon the tightening of bolt 9.

Closing the upper end of casing 10 is a removable cover 20 having top plate 21 with a flat upper surface and downwardly extending sides 22 which protrude from the edges of plate 21 so as to overlap the upper edge portions of front 11 and sides 13. The back side 22 of cover 20 is wider than the remaining sides 21 so as to overlap back 15, the back 15 being shorter than front 11. Therefore, sufficient space is provided in back side 22 to permit appropriate apertures to be provided for mounting an on-off switch 23 and a grommet 24, and to provide temporary storage space for seven feet of wire 25. Wire 25 leading from the battery 17 passes through grommet 24.

As seen in FIGS. 1 and 2, a rectangular pivot arm carrying plate 26, smaller than plate 21, is bolted, by means of bolts 27, to plate 21. A flat pivot arm 29 is carried by the central portion of plate 26, one end of arm 29 being hingedly secured to plate 26 by a hinge pin 30. As seen in FIG. 1, the hinge pin 30 is transversely aligned with center line 28 while the arm 29 is longer than the distance from pin 30 to the outer edge of the cover plate 21. Thus, the arm 29 selectively protrudes beyond either edge of plate 21.

At the outer end of arm 29 are a pair of opposed brackets consisting of an upwardly extending mounting bracket 31 and a downwardly extending mounting bracket 32. Each bracket, such as bracket 31, includes a base 33 which is bent at its front edge to provide a flange 34. The bases, such as base 33, are secured to the upper and lower surfaces of the end portions of arm 29 as by spot welding, or the like, while the flanges, such as flange 34, extend in the same vertical plane, respectively upwardly and downwardly, being parallel to the front edge of arm 29. The flanges of brackets 31 and 32 are provided with central apertures which receive and carry indicator lights 35 and 36, respectively.

Referring now to the pointer 12, it will be seen that this flat metal member includes a hub at one end having a central hole through which protrudes a pivot pin 40, the pivot pin 40 being mounted at the center line 28 on the front surface of front 11 and protruding outwardly therefrom. The other portion of the pointer includes a pair of straight downwardly tapering edges which come to a point 41 at its lower end.

In the arc of swing of the point 41 about pin 40 are spaced radially extending indicia 42 and 43 on opposite sides of the center line 28, the indicia 42 and 43 being imprinted on the front 11 and indicating in graduated markings the function, e.g., the cotangent, of the angle subtended between the pointer 12 and the center line 28, when the pointer 12 is pointing to the particular indicia 42 and 43. Of course, if desired, the angle itself may be given. It will be understood that center line 28 is usually about normal to or perpendicular to bottom 14; thus, indicia 42 and 43 indicate the tangent of the angle subtended between point 12 and bottom 14.

In the central portion of the pointer 12 is an outwardly extending clip or bracket 44 which pivotally retains a U-shaped mercury switch denoted generally by numeral 45. In FIG. 4 it is seen that the mercury switch includes an arcuate tubular member 46 formed of electrically conductive material, such as iron or stainless steel. The ends of the tubular member 46 are closed by plugs 47 and 48 which carry electrodes 49 and 50. Plugs 47 and 48 are formed of a dielectric material such as rubber or plastic while the electrodes 49 and 50 protrude inwardly toward each other, being held spaced from contact with the wall of tubular member 46 and hence electrically insulated therefrom. The mercury 51 carried within tubular member 46 is insufficient to contact both electrodes 49 and 50 simultaneously and insufficient to contact either electrode 49 or 50 except when the tubular member is tilted from its horizontal position. It is therefore seen that a gravity actuated, single pole, double throw mercury switch 45 is provided.

The mercury switch 55 shown in FIG. 5 is essentially the same as switch 45 and may be substituted therefor, if desired. Switch 55 includes an arcuate tubular metal member 56 closed at its ends by insulating plugs 57 and 58, the plugs carrying electrodes 59 and 60 for contact with the mercury 61 within the tubular member 56. The difference between switches 45 and 55 is that the tubular member 56 is bent at a relatively sharp radius, thereby forming a semi-annular configuration whereby the mercury 61 contacts electrodes 59 or 60 only when the switch 55 is tilted by about 80° from its transverse position. On the other hand, only a slight tilting of switch 45 will cause the mercury 51 to contact electrodes 49 or 50.

It will be understod that when the mercury 51 or 61 contacts its electrodes 49, 50 or 59, 60, an electrical circuit is made between the tubular member 45 or 55 and the electrode so contacted.

Referring to FIG. 3, it will be seen that the mercury switch 45 is grounded, i.e. the tubular member 45 is grounded to casing 10 via clip 44, pointer 12, pin 40 and front 11. Likewise, one terminal of switch 23 is grounded to casing 10, the other terminal leading to one terminal of battery 17. Therefore, the switch 23, battery 17 and tubular member 46 are in series. The other terminal of battery 17 is connected via wire 25 to one terminal of each of lights 35 and 36. The other terminal of light 36 is connected via wire 63 to electrode 50 while the other terminal or light 35 is connected via wire 62 to electrode 49. Therefore, when switch 23 is closed, the tilting of mercury switch 45 in one direction will complete a circuit through light 35 while the tilting of the mercury switch 45 in the opposite direction will complete a circuit through light 36. It is now seen, therefore, that the mercury switch 45 serves as a means for selectively actuating lights 35 and 36.

In operation, the casing 10 may be mounted on any vehicle. In FIG. 6 it is seen that the casing 10 is mounted transversely by a chain 70 to the tow bar 71 of a grader. The plate 26 may be removed from the plate 21 by removing bolts 27. The plate 26 is then clamped by means of a C-clamp 72 to the blade 73 of the grader, preferably adjacent the left outer end of the blade 73, in plain view of the operator. The slope is then dialed by manipulation of pointer 12.

If the bottom edge 74 of blade 73 is unevenly worn, the blade 73 will not be parallel to the upper surface of tow bar 71 and hence will not be parallel to bottom 14. This will mean that when the center line 28 is vertical the blade edge 74 will not be parallel. To remedy the situation, the blade edge 73 should be arranged parallel, say on a template or board (not shown). Thereafter, the point 12 is arranged along center line 28, pointing to the letter H on front 11 and the switch 23 closed. Next, the bolt 9 is loosened and the front pivoted up or down until both lights 35 and 36 are off. The bolt 9 is then tightened in place, thereby servicing the pointer 12 for the particular blade edge 74.

Assume, for purpose of illustration, that switch 23 is closed, the pointer 12 is pivoted so as to point to one of the indicia 43, and that the grader, i.e. tow bar 71, is in a transversely horizontal position. This would cause tilting of the mercury switch 45 so that mercury 51 contacts electrode 49 to complete the circuit to light 35. This would indicate to the operator that the left end of the blade 73 must come up to achieve the desired grade or slope. Therefore, the grader is operated to achieve this result.

As the desired slope is approached, the mercury switch 45 will be moved to a level position whereby the mercury 51 is returned to its neutral position as shown in FIG. 4. This breaks the circuit to light 35 and hence neither light 35 nor light 36 is lighted. If, however, the grade or slope is exceeded, the mercury switch 51 is tilted sufficiently for mercury 51 to contact electrode 50 and complete a circuit to light 36. This indicates to the operator that a less steep grade or slope is desired.

It will be observed in FIG. 1 that the ends of the mercury switch 45 extend upwardly under normal conditions. If a more sensitive control is desired, the mercury switch 45 may be rotated outwardly, pivoting in clip 44 whereby the ends of mercury switch 45 are more nearly in the same plane with the central portion of the mercury switch 45. Thus, any slight tilting will cause mercury 51 to run toward the lower end and make contact with the appropriate electrode 49 or 50.

In some instances it is desirable to have light 36 above light 35, as to control the slope from the right side of the blade, while having the plate 26 remain in essentially the same position. This is accomplished by simply swinging arm 29 in a clockwise direction as viewed in FIG. 1 so that the arm 29 rests upon the right hand portion of the plate 26, rather than the left hand portion thereof.

It will be understood by those skilled in the art that many variations may be made in the embodiment chosen for the purpose of illustrating the present invention without departing from the scope thereof as defined by the appended claims.

I claim:

1. A slope indicator comprising a box-like casing, a battery within said casing, an on-off switch mounted on said casing, a circuit for said battery and connected to said on-off switch, a mercury switch carrying arm pivotally mounted on said casing, a mercury switch mounted transversely on the central portion of said carrying arm, said mercury switch including a U-shaped tubular member formed of conducting material, mercury within said U-shaped tubular member, plugs closing the ends of said tubular member, a pair of electrodes respectively carried by said plugs and insulated from said tubular member, said tubular member being connected in series with said switch and said battery in said circuit, a pair of lights electrically connected respectively to said electrodes and to said battery, a plate removably carried by said casing, an arm pivotally mounted on the central portion of said plate, said arm selectively protruding beyond the ends of said plate, and light mounting brackets at the end of said arm, said lights being respectively carried by said mounting brackets.

2. A slope indicator for attachment to an object to indicate the disposition of said object with the lines of gravity of the earth, said slope indicator comprising:
   (A) an adjustable mounting member for attachment to and adjustable alignment with said object,
      (1) a series of markings arranged in an arc on said adjustable mounting member,
   (B) an arm pivotally attached at one end to said adjustable mounting member vertically above and at the center point of the arc of said markings so that the end of said arm remote from said one end is arranged to selectively point at one of said markings,
      (1) clamping means connected to said arm between the ends thereof,
   (C) a gravity actuated single pole double throw switch mounted in said clamping means,
   (D) a first indicating means electrically connected to a first terminal of said double throw switch,
   (E) a second indicating means electrically connected to a second terminal of said double throw switch,
   (F) a source of electrical current for energizing said first and second indicating means, and
   (G) means for maintaining said arm in a predetermined position to point toward one of said markings.

References Cited by the Examiner

UNITED STATES PATENTS

| | | | |
|---|---|---|---|
| 1,142,134 | 6/15 | Barrows | 340—263 |
| 1,375,278 | 4/21 | Clayton | 340—282 |
| 2,100,105 | 11/37 | Lee et al. | 340—262 |
| 2,122,921 | 7/38 | Sands | 200—61.47 |
| 2,306,877 | 12/42 | Gould | 200—59 |
| 2,338,811 | 1/44 | Rice | 200—61.52 |
| 2,383,889 | 8/45 | Rice | 200—61.52 |
| 2,547,199 | 4/51 | Dezzani | 200—52 |
| 2,831,183 | 4/58 | Wamack | 340—262 |
| 2,950,365 | 8/60 | Bolstad | 200—61.52 |
| 2,986,616 | 5/61 | Hanserd | 200—61.52 |
| 3,084,233 | 4/63 | Von Ohlsen | 200—61.52 |

FOREIGN PATENTS

| | | |
|---|---|---|
| 352,070 | 4/22 | Germany. |
| 643,079 | 9/28 | France. |

NEIL C. READ, *Primary Examiner.*

BENNETT G. MILLER, *Examiner.*